US007717619B2

(12) United States Patent
Katcha et al.

(10) Patent No.: US 7,717,619 B2
(45) Date of Patent: May 18, 2010

(54) CONTACTLESS POWER AND DATA TRANSMISSION APPARATUS

(75) Inventors: Jason Stuart Katcha, Whitefish Bay, WI (US); Gregory Martin Dunlap, St. Charles, IL (US); Kai Chi Chan, Bloomingdale, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/016,824

(22) Filed: Jan. 18, 2008

(65) Prior Publication Data

US 2009/0185658 A1 Jul. 23, 2009

(51) Int. Cl.
*H05G 1/02* (2006.01)
*G01N 23/083* (2006.01)

(52) U.S. Cl. .............................. 378/197; 378/4; 378/15

(58) Field of Classification Search ..................... 378/4, 378/15, 19, 196, 197; 385/26
See application file for complete search history.

(56) References Cited

U.S. PATENT DOCUMENTS 4,401,360 A * 8/1983 Streckmann et al. .......... 385/26
4,466,695 A * 8/1984 Kruger ........................ 385/26
4,723,259 A * 2/1988 Amor et al. ................... 378/10
4,912,735 A 3/1990 Beer
5,134,639 A * 7/1992 Vekstein et al. ............... 378/15
5,336,897 A * 8/1994 Watanabe et al. ........... 250/551
5,354,993 A * 10/1994 Kedmi et al. ................ 250/551
5,530,425 A 6/1996 Harrison
5,579,357 A 11/1996 Harrison
5,608,771 A 3/1997 Steigerwald et al.
6,433,631 B2 8/2002 Pearson, Jr. et al.
6,563,717 B2 * 5/2003 Lunding et al. ............... 363/15
6,674,836 B2 * 1/2004 Harada et al. ............... 378/107
6,718,005 B2 * 4/2004 Hamada et al. ............... 378/15
7,050,616 B2 * 5/2006 Hsieh et al. ................. 382/131
7,054,411 B2 5/2006 Katcha et al.
7,079,619 B2 7/2006 Katcha et al.
7,197,113 B1 3/2007 Katcha et al.
7,539,284 B2 * 5/2009 Besson ........................ 378/62
2006/0022785 A1 * 2/2006 Dobbs ........................ 336/120
2007/0035883 A1 2/2007 Katcha et al.
2008/0095314 A1 4/2008 Katcha et al.

* cited by examiner

*Primary Examiner*—Edward J Glick
*Assistant Examiner*—Thomas R Artman
(74) *Attorney, Agent, or Firm*—Dean Small; Small Patent Law Group

(57) ABSTRACT

Methods and apparatus for an imaging system are provided. The imaging system includes a gantry having a stationary member coupled to a rotating member. The rotating member has an opened area proximate an axis about which the rotating member rotates. An x-ray source provided on the rotating member. An x-ray detector may be disposed on the rotating member and configured to receive x-rays from the x-ray source. A rotary transformer having circumferentially disposed primary and secondary windings may form part of a contactless power transfer system that rotates the rotatable portion of the gantry at very high speeds, the primary winding being disposed on the stationary member and the secondary winding being disposed on the rotating member.

16 Claims, 8 Drawing Sheets

CONTACTLESS POWER AND DATA TRANSMISSION APPARATUS

BACKGROUND OF THE INVENTION

This invention generally relates to the transmission of data and power across a rotating interface, and more particularly, to an apparatus that can transmit both power and data across the rotating interface without requiring brushes or other contacts.

High-voltage power transformers are used in a variety of applications, such as in baggage scanner systems, computed tomography (CT) systems, wind turbines, and other electronic systems. CT systems are often used to obtain non-invasive sectional images of test objects, particularly internal images of human tissue for medical analysis and treatment. Current baggage scanner systems and CT systems position the test object, such as luggage or a patient, on a conveyor belt or table within a central aperture of a rotating frame (e.g., gantry) which is supported by a stationary frame. The rotating frame includes an x-ray source and a detector array positioned on opposite sides of the aperture, both of which rotate around the test object being imaged. At each of several angular positions along the rotational path (also referred to as "projections"), the x-ray source emits a beam that passes through the test object, is attenuated by the test object, and is received by the detector array. The x-ray source utilizes high-voltage power to generate the x-ray beams.

Each detector element in the detector array produces a separate electrical signal indicative of the attenuated x-ray beam intensity. The electrical signals from all of the detector elements are collected and processed by circuitry mounted on the rotating frame to produce a projection data set at each gantry position or projection angle. Projection data sets are obtained from different gantry angles during one revolution of the x-ray source and detector array. The projection data sets are then processed by a computer to reconstruct the projection data sets into, for example, an image of a bag or a CT image of a patient.

The circuitry mounted on the rotating frame is powered by low-voltage power, while the x-ray source is powered by high-voltage power. Conventional rotating gantry based systems utilize a brush and slip ring mechanism to transfer power at a relatively low-voltage between the stationary and rotating portions of the gantry frame. The rotating gantry portion has an inverter and high-voltage tank mounted thereon and connected to the brush and slip ring mechanism. The inverter and high-voltage tank include transformer, rectifier, and filter capacitance components that step-up the voltage from the low-voltage, transferred through the brush and slip ring mechanism, to the high-voltage needed to drive the x-ray source. The transformer in the high-voltage tank produces a high-voltage AC signal that is converted to a high-voltage DC signal by rectifier circuits inside the high-voltage tank.

Conventional rotating gantry based scanner systems have experienced certain disadvantages. The high-voltage tank and inverter on the rotating gantry portion increases the weight, volume and complexity of the system. Furthermore, the brush and slip ring mechanisms (that are typically used to carry appreciable current) are subject to reduced reliability, maintenance problems, and electrical noise generation, which interfere with sensitive electronics. As systems are developed that rotate faster, it becomes desirable to reduce the volume and weight of the rotating components.

To eliminate slip ring brushes, rotary transformers can be used to transfer power in a contactless manner to the rotating gantry. However, the voltage and current in rotating transformers used to transfer power in CT imaging systems are quite considerable. For example, a 150 KW imaging system may have a rotary transformer that operates at approximately 300 volts and 500 amperes and that generates a considerable amount of electrical noise. Extraordinary steps are required to keep this noise out of data being transmitted across the gantry. For example, some CT imaging systems utilize optical signals for data transmission. In one such system, an optical signal is injected into a mirror groove that is configured to bounce the optical signal in both directions across the gantry, from a 0 degree location to a ±180 degree location. An optical stylus is inserted into the groove from an opposite side of the gantry to pick up the optical signal. Another such system uses a plurality of optical transmitters that are multiplexed. The optical transmitters pass across a stationary shoe with an optical detector as the gantry rotates, and the optical transmitters are synchronized to the changing location of the detector. These configurations are relatively costly and complicated.

A scanner apparatus is needed that addresses the above concerns and other problems experienced in the past, and that is relatively inexpensive and simple.

BRIEF DESCRIPTION OF THE INVENTION

There is thus provided, in one embodiment of the present invention, an apparatus for transmitting power and data. The apparatus includes a first rotary transformer portion and a second rotatable transformer portion separated by a gap and relatively rotatable around a common axis. The rotary transformer has a first differential winding on the first rotary transformer portion and a second differential winding on the second rotary transformer portion. The first differential winding and the second differential winding are relatively rotatable with respect to each other while remaining separated from one another. The rotary transformer is configured to transfer power from the first rotary transformer portion to the second rotary transformer portion. The rotary transformer also has a first data transmitter on the first rotary transformer portion, a second data transmitter on the second rotary transformer portion, a first data receiver on the second rotary transformer portion and operatively coupled to the first data transmitter to provide data transmission in a first direction across the gap, and a second data receiver on the first rotary transformer portion and operatively coupled to the second data transmitter to provide data transmission in a second direction across the gap.

In another embodiment of the present invention, there is provided a computed tomography (CT) imaging system. The CT imaging system includes a gantry defining a boundary between a stationary portion of the CT imaging system and a rotating portion of the CT imaging system. The gantry has a stationary member coupled to a rotatable member. The rotatable member has an opened area proximate an axis about which the rotatable member rotates. The rotatable member further includes a rotatable transformer portion and the stationary member further includes a stationary transformer portion. The CT imaging device includes a radiation source and a radiation detector array opposite one another on the rotatable member. Also included is electronic circuitry in the rotating portion of the CT imaging system. The electronic circuitry includes a data acquisition system operatively coupled to the radiation detector array. The CT imaging system also includes a stationary transformer portion on the stationary member and a rotatable transformer portion on the rotatable member. The stationary transformer portion and rotatable transformer portion are separated by a gap. Also, the rotary transformer has a stationary differential winding on the stationary transformer portion and a rotatable differential winding on the rotatable transformer portion, wherein the rotatable differential winding is configured to rotate while remaining separated from the stationary differential winding, and the rotatable transformer configured to transfer power from the stationary portion of the CT imaging system to the electronic circuitry in the rotating portion of the imaging system. Further included is a rotatable data transmitter on or mounted to the rotatable transformer portion, a stationary data transmitter on or mounted to the stationary transformer portion, a rotatable data receiver on the rotatable transformer portion and operatively coupled to the stationary data transmitter to provide data transmission in a first direction across the gap, and a stationary data receiver on the stationary transformer portion and operatively coupled to the rotatable data transmitter to provide data transmission in a second direction across the gap.

In yet another embodiment of the present invention, there is provided a wind turbine comprising having a generator, a controller, a nacelle housing the generator and controller, a rotor having a hub and at least one blade, the rotor coupled to the generator by a shaft and the hub including a blade pitch control and heater for the at least one blade or blades, and a controller configured to communicate data with sensors and controls within the wind turbine, including the blade pitch control and heater. Also included is a rotatable transformer portion mounted on the shaft and a stationary transformer portion separated by a gap, a rotary transformer having a stationary differential winding on the stationary transformer portion and a rotatable differential winding on the rotatable transformer portion, wherein the rotary transformer is configured to allow the stationary differential winding and the rotatable differential winding to rotate while remaining separated from one another, and to supply power to the blade pitch control and heater. Further includes is a rotatable data transmitter on the rotatable transformer portion on the shaft and a stationary data transmitter on the stationary transformer portion, a rotatable data receiver on the rotatable transformer portion and operatively coupled to the stationary data transmitter to provide data transmission in a first direction across the gap, and a stationary data receiver on the stationary transformer portion and operatively coupled to the rotatable data transmitter to provide data transmission in a second direction across the gap.

DETAILED DESCRIPTION OF THE INVENTION

Figure 2:
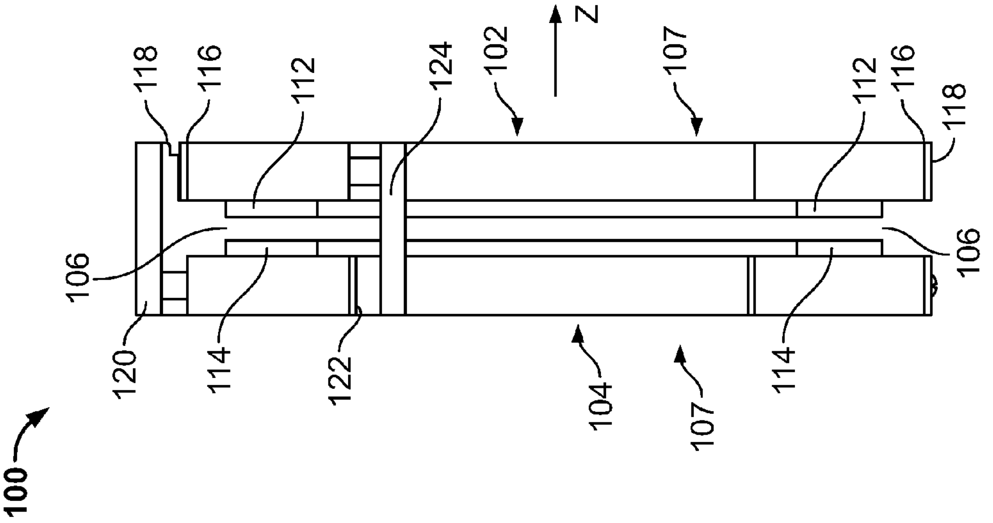
FIG. 2 is a side view taken along a slice 2-2 of FIG. 1.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word “a” or “an” should be understood as not excluding plural said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

Figure 1:
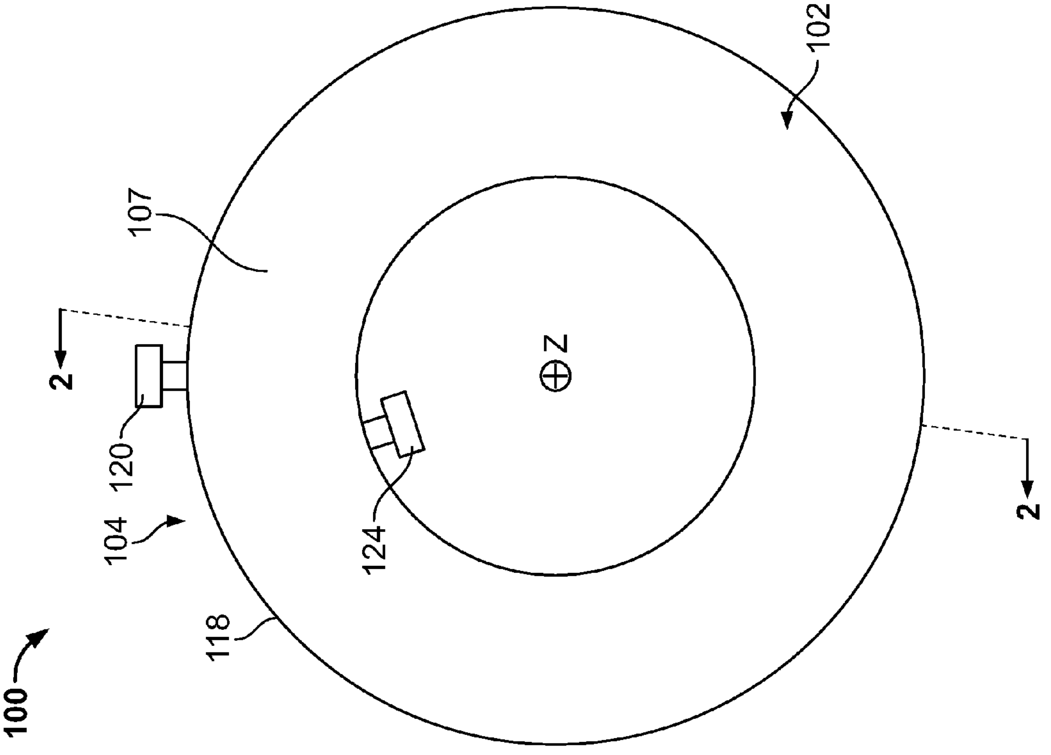
FIG. 1 is a front partial cut-away view of an apparatus for transmitting power and data in accordance with an exemplary embodiment of the invention.

FIG. 1 is a front partial cut-away view of an apparatus 100 for transmitting power and data in accordance with an exemplary embodiment of the invention, and FIG. 2 is a side view taken along a slice 2-2 of FIG. 1. The apparatus 100 has two rotary transformer 107 portions 102 and 104 separated by a gap 106 and relatively rotatable around a common axis z. Rotary transformer 107 also comprises a first differential winding 108 (shown in FIG. 3) on first rotary transformer portion 102 and a second differential winding 110 (shown in FIG. 3) on second rotary transformer portion 104. First differential winding 108 and second differential winding 110 (not shown in FIG. 1 or FIG. 2, but visible in FIGS. 3 and 8) are rotatable relative to second transformer portion 104 and first transformer portion 102, respectively, while remaining separated from one another. Windings 108 and 110 themselves are shown and described elsewhere herein, but in one embodiment of the present invention are wound in E-cores 112 and 114 with the open portion of the “E”s facing one another. (The “open portion” of an “E” is the right portion. The left portion is a “closed portion.”) The term “E-core” should be understood as encompassing not only cores with two grooves between the three horizontal lines of the “E,” but also cores that have more than two grooves and more than three horizontal lines to the “E.”

Apparatus 100 further includes a first data transmitter 116 on first rotary transformer portion 102. Although first data transmitter 116 includes additional electrical components, in one embodiment, first data transmitter 116 comprises a differential stripline transmission line 118 that is wrapped around first rotary transformer portion 102. A differential voltage is applied to first data transmitter 116 to transmit to a first data receiver 120 on second rotary transformer portion 104 across gap 106. Similarly, apparatus 100 further includes a second data transmitter 122 on second rotary transformer portion 104, and data is transmitted to second data receiver 124 on first rotary transformer portion 102 across gap 106. Data receivers 120 and 124 can comprise one or two (or a plurality of) pickup antennas or pads cantilevered a distance, for example, about a millimeter, above corresponding transmission line transmitters. Transmission lines such as transmission line 118 can comprise a single transmission strip or a dual transmission slip. Differentially wound coils are described in U.S. Pat. No. 7,054,411, entitled "Multichannel contactless power transfer system for a computed tomography system", which issued on May 30, 2006 to Katcha et al., and U.S. Pat. No. 7,197,113, entitled "Contactless power transfer system," which issued on Mar. 27, 2007 to Katcha et al., both patents being assigned to General Electric Co., Schenectady, N.Y.

In some CT imaging systems, apparatus 100 is used to couple data signals and power across a gantry. It should be noted that even though a large amount of power (e.g., 150 KW) can be transferred, there is very little if any interference to data voltages of less than 1 V on the stripline transmission lines used for data transmission and reception. In general, the differential windings on the E-core, i.e., windings wrapped around the center or an inside leg of the E-core, results in leakage fields that are closely contained, despite the high voltages and currents and the leakage inductance resulting from the open gap between the windings. The addition of resonant capacitors in the windings of the transformer can further reduce any noise that may remain in data channels.

In some embodiments, first data receiver 120 and first data transmitter 122 are coupled optically rather than electrically and second data receiver 124 and second data transmitter 122 are coupled optically rather than electrically. In another embodiment, first data receiver 120 and first data transmitter 116 are coupled magnetically rather than electrically and second data receiver 124 and second data transmitter 122 are coupled magnetically rather than electrically. However, in other embodiments, first data receiver 120 and first data transmitter 116 are coupled electrically and second data receiver 124 and second data transmitter 122 are coupled electrically in a manner such as that described in conjunction with FIGS. 1 and 2.

Figure 3:
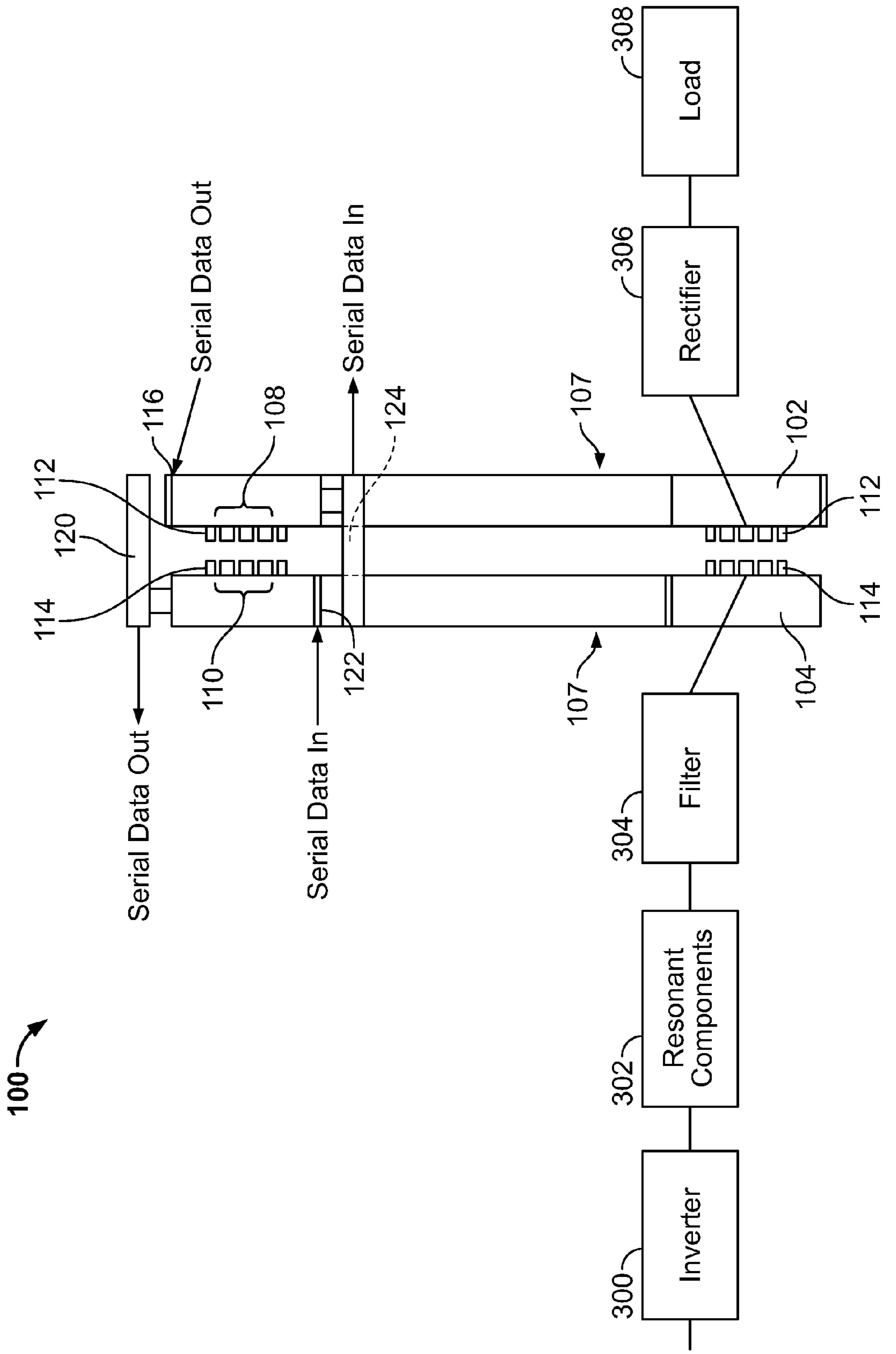
FIG. 3 is a block schematic diagram showing additional details of an electronic coupling used in one embodiment of the present invention.
Figure 4:
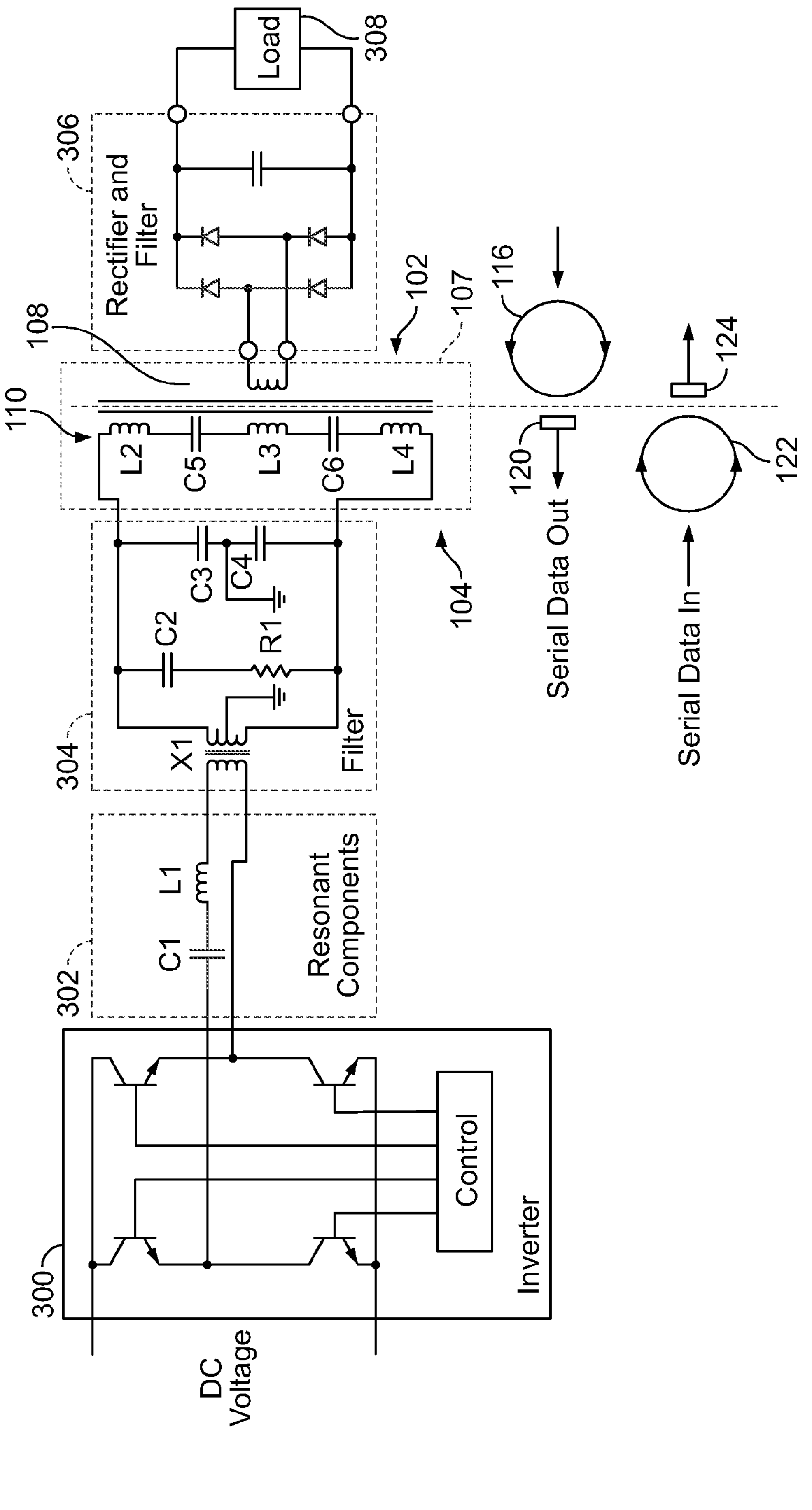
FIG. 4 is a more detailed block schematic diagram of one embodiment of the present invention.

FIG. 3 is a block schematic diagram showing additional details of an electronic coupling used in one embodiment of the present invention. Inverter 300, resonant components 302, and filter 304 serve to couple an AC voltage to transformer winding 110, while rectifier 306 serves to couple an induced voltage on transformer winding 108 to load 308. FIG. 4 is a more detailed block schematic diagram of one embodiment of the present invention. Once the detailed description provided herein is thoroughly understood, the selection of components 402, X1, C1, C2, C3, C4, C5, C6, L2, L3, L4, and R1, as well as other components shown in FIG. 4, can be left as a design choice to one of ordinary skill in the art of electronic power circuit design.

Figure 5:
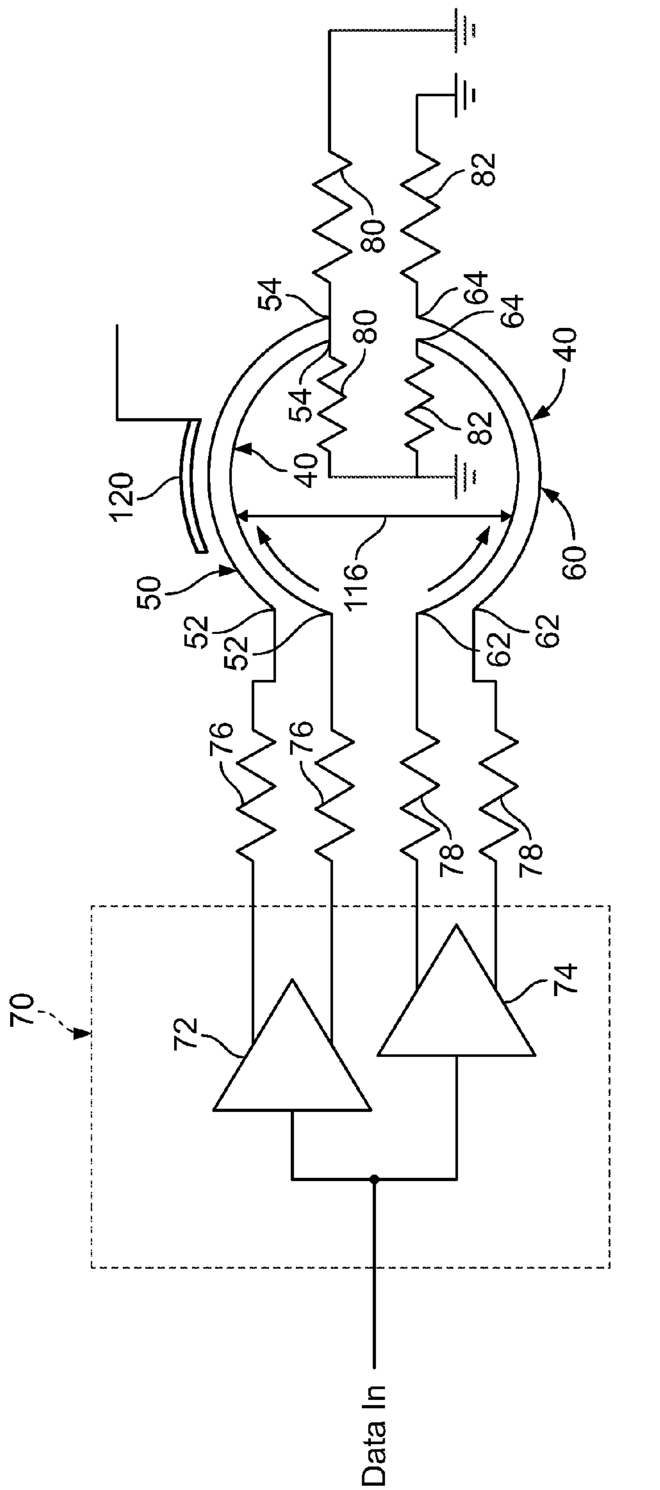
FIG. 5 is an exemplary schematic representation of an apparatus having electrical coupling between a data receiver and a data transmitter employing a transmission line antenna.
Figure 6:
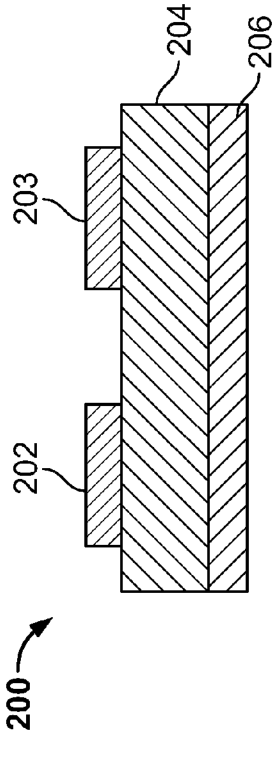
FIG. 6 is a cross-sectional view of an exemplary embodiment of a stripline pair.

FIG. 5 is an exemplary schematic representation of an apparatus having electrical coupling between a data receiver (e.g., first data receiver 120) and a data transmitter (e.g., first data transmitter 116) employing a transmission line antenna. To avoid abrupt phase changes that might generate data errors, transmission line 40 comprises respective individual segments 50 and 60 each having a respective first end 52 and 62 and a respective second end 54 and 64. Each individual segment 50 and 60 has a respective electrical length chosen so that a signal applied at each respective first end 52 and 62 has a predetermined time-delay upon arrival at each respective second end 54 and 64. It will be appreciated that if the respective electrical lengths for segments 50 and 60 are substantially similar to one another, e.g., close to 180 degrees, the above-described segment arrangement results in the serial data stream signal arriving at each respective second end having a substantially similar time delay relative to one another.

The data signal can be readily split and amplified by a suitable driving circuit 70 comprising amplifiers 72 and 74 and optional matching resistors 76 and 78 having a predetermined resistance value selected to match the impedance characteristics of the respective transmission line segments. Similarly, each respective second end 54 and 64 is respectively connected to termination resistors 80 and 82 having a predetermined resistance value chosen to minimize reflection of energy in individual transmission line segments 50 and 60. Other arrangements may be employed, which although having differences in time delay between individual segments, such time-delay differences can be tolerated depending on the specific application. For example, amplifier 74 and matching resistor 78 can be connected to second end 64 in lieu of first end 62 and termination resistor 82 connected to first end 62 in lieu of second end 64. In this case although a predetermined time delay exists between respective first and second ends, such delay could be acceptable in certain applications. Further, although driving circuit 70 is shown as comprising a pair of amplifiers, it will be apparent that a suitable single amplifier can be employed equally effectively for driving individual segments 50 and 60. For example, each respective first end 52 and 62 can be readily connected in parallel to receive the output signal of a single amplifier, and thus, in this case, driving circuit 70 comprises a single amplifier. Thus, a transmission line, such as a center tapped transmission line, having respective segments electrically connected in parallel to a single amplifier can be optionally employed.

Individual segments 50 and 60 in one embodiment are arranged so that respective first ends 52, 62 of any two consecutive segments are substantially adjacent to one another and respective second ends 54, 64 of any two consecutive segments 50, 60 are substantially adjacent to one another. The gap size between any two consecutive segments 50, 60 should be small relative to a wavelength corresponding to the data rate. This arrangement allows for avoiding time-delay discontinuities between any of the respective individual segments 50, 60 encircling the rotating frame, and for effective coupling operation between the transmission line and the receiver at all rotation angles. As shown in FIG. 5, each of the two individual segments 50 and 60 can be designed to subtend a respective angle of about 180 degrees around the rotating frame. A data receiver (e.g., first data receiver 120) is held sufficiently near segments 50 and 60 for establishing radio coupling therebetween. As used herein the expression "radio coupling" refers to noncontactive transfer of energy by electromagnetic radiation at radio frequencies.

In some embodiments of the present invention, each individual segment 50 and 60 comprises two striplines fed in a differential manner. The differential feeding of the stripline pair in segment 50 and the differential feeding of the stripline pair in segment 60 results in substantial containment of fields and a reduction in emission of high frequency interference. The stripline pairs can be etched on flexible board, resulting in an inexpensive and simple data coupling mechanism. An exemplary differential stripline embodiment is shown in FIG.

6, which shows a cross-sectional view of a stripline pair of segment 50. Segment 50 comprises a first conductor 202 and a second conductor 203 deposited or etched onto an insulating substrate 204 and a conductive ground plane 206. The selection of this or another suitable differential stripline embodiment is a design choice that may be made by one of ordinary skill in the art.

Thus, in some embodiments of the present invention, the first data receiver, the second data receiver, the first data transmitter and the second data transmitter can comprise sectioned, circular stripline antennas. In some of these embodiments, the sections of the circular stripline antennas are phased to reduce or eliminate phase discontinuities in coupled data signals. A description of a stripline antenna can be found in U.S. Pat. No. 5,579,357, entitled "Transmission line using a phase splitter for high data rate communication in a computerized tomography system," issued Nov. 26, 1996 to Daniel D. Harrison and assigned to General Electric Company, Schenectady, N.Y.

Figure 7:
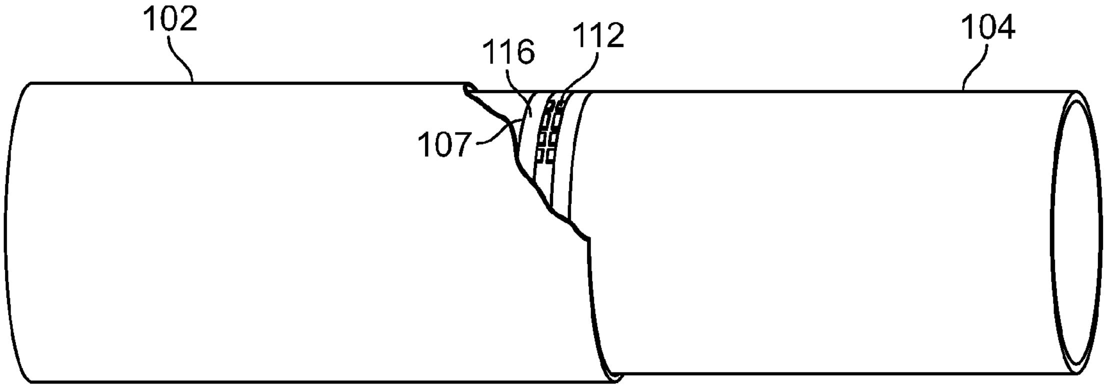
FIG. 7 is a partial cut-away drawing showing a first rotary transformer portion and a second rotary transformer portion that comprise substantially concentric cylinders.

Referring again to FIG. 2, first rotary transformer portion 102 and second rotary transformer portion 104 substantially face one another. The data and power couplings in this case are in an axial or z direction. The data and power couplings do not require shielding. In another embodiment, and as shown in FIG. 7, first rotary transformer portion 102 and second rotary transformer portion 104 can comprise substantially concentric cylinders, in which the data and power couplings are oriented in a radial or r direction.

In some embodiments of the present invention, either first rotary transformer portion 102 or second rotary transformer portion 104 is constrained to be stationary. "Stationary" in this sense implies little or no rotational movement around at least the z axis as observed by an observer on the ground. For example, where apparatus 100 is used in a gantry of a CT imaging apparatus, one portion of the apparatus is stationary with respect to the ground while the other portion is considered to be rotating.

Figure 8:
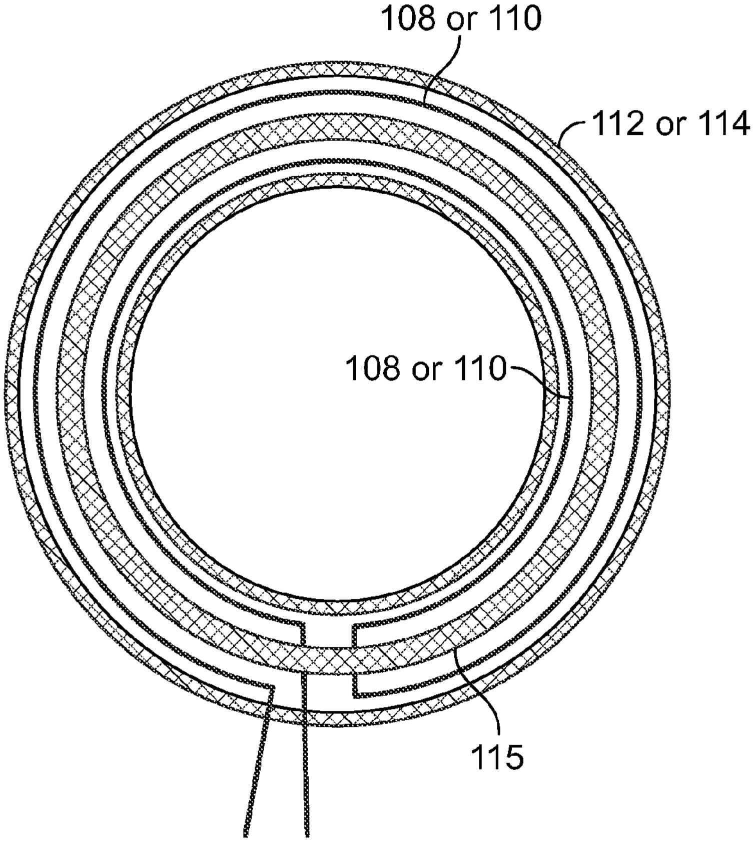
FIG. 8 is an illustration of one winding of the rotary transformer included in the embodiment shown in FIG. 1 and FIG. 2, showing the relationship of the winding and an E-core.

FIG. 8 is another illustration of one winding 108 or 110, showing relationship to an E-core 112 or 114. Rotary transformer 107 comprises a pair of windings 108 and 110 each wound on a separate E-core 112 or 114, respectively, with open sides of the E-cores 112 and 114 facing one another. If there is no gap between E-cores 112 and 114, windings 108 and 110 would be enclosed within the abutting E-cores 112 and 114. The winding shown in FIG. 8 is a differential winding because the winding goes around the middle leg 115 of the E-core 112 or 114. Although a winding with only one turn is shown, the various embodiments of the invention are not limited to requiring windings to have only one turn. The number of turns can be a design choice that can be made by one of ordinary skill in the art.

Figure 9:
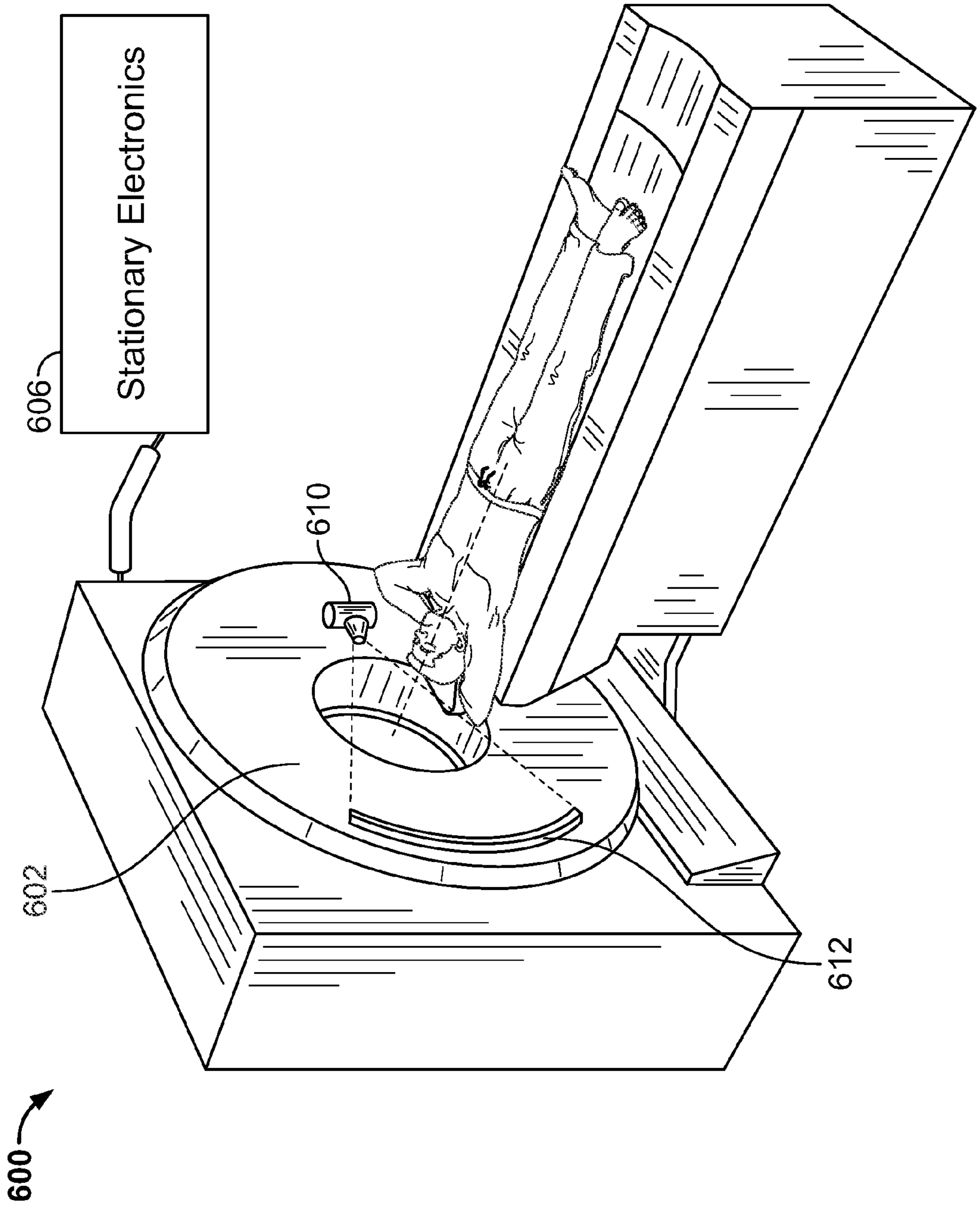
FIG. 9 is a pictorial illustration of an exemplary computed tomography (CT) imaging system embodiment of the present invention.
Figure 10:
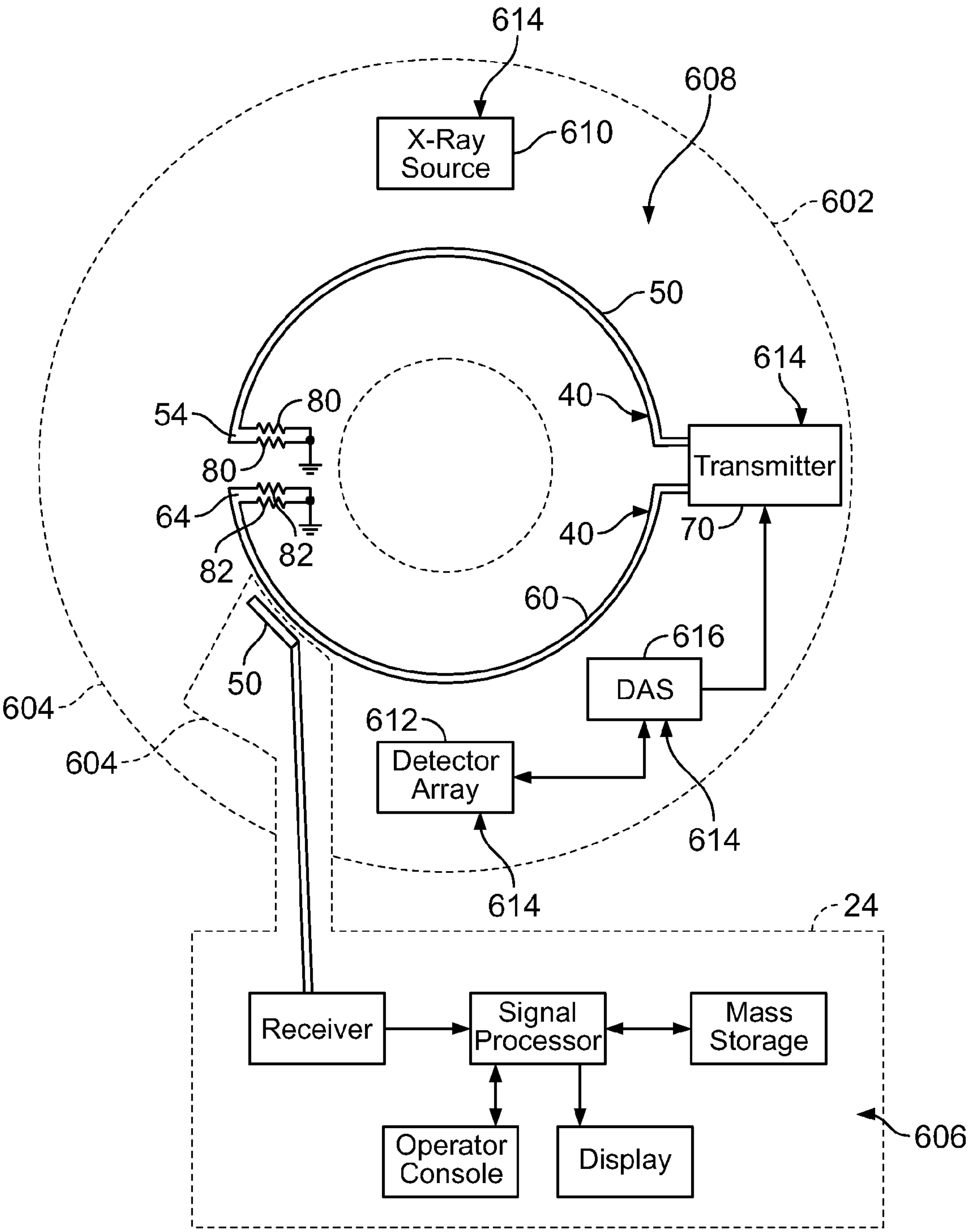
FIG. 10 is a block schematic diagram of the CT imaging system shown in FIG. 9.

FIG. 9 is a pictorial illustration of an exemplary computed tomography (CT) imaging system 600 in accordance with an embodiment of the present invention, and FIG. 10 is a block schematic diagram of CT imaging system 600 of FIG. 9. CT imaging system 600 includes a gantry 602 defining a boundary 604 between a stationary portion 606 of CT imaging system 600 and a rotatable portion 608 of CT imaging system 600. Gantry 602 includes a rotatable transformer portion 102 (see FIG. 1 and FIG. 2) and a stationary transformer portion 104 that is constrained to be "stationary" by its mounting. The designations "first" and "second" can be associated with "stationary" and "rotatable" arbitrarily, provided the association is consistent throughout. Note, however, that the first and the second data receivers are on the opposite sides of the first and the second data transmitter, respectively. Also, "stationary," as used herein, means stationary rather than rotating about the same axis as the corresponding rotatable component as viewed from an observer standing on the floor. A rotatable radiation source 610 such as an x-ray tube is provided on gantry 602 as well as a rotatable radiation detector array 612 opposite radiation source 610. Radiation source 610 and radiation detector array 612 rotate with rotatable transformer portion 102 when gantry 602 rotates. Rotatable portion 608 of CT imaging system 600 also includes electronic circuitry 614, including a data acquisition system 616 operatively coupled to radiation detector array 612. CT imaging system 600 further includes a stationary transformer portion 104, wherein stationary transformer portion 104 and rotatable transformer portion 102 are separated by a gap 106 (see FIG. 1 and FIG. 2).

Rotary transformer 107 in CT imaging system 600 includes a stationary differential winding 110 on stationary transformer portion 104 and a rotatable differential winding 108 on rotatable transformer portion 102 (See FIG. 1 and FIG. 2). Rotatable differential winding 108 is configured to rotate while remaining separated from stationary differential winding 110, and rotatable transformer 107 is configured to transfer power from stationary portion 606 of CT imaging system 600 to electronic circuitry 614 in rotatable portion 608 of CT imaging system 600. A rotatable data transmitter 116 is on rotatable transformer portion 102 and a stationary data transmitter 122 is on stationary transformer portion 104. Also, a rotatable data receiver 124 is on rotatable transformer portion 102 and is operatively coupled to stationary data transmitter 122 to provide data transmission in a first direction across gap 106, and a stationary data receiver 120 is on stationary transformer portion 104 and operatively coupled to rotatable data transmitter 116 to provide data transmission in a second direction across gap 106. Transmitters and receivers use one of an electric, magnetic, or optical signal to transmit data in a contactless manner. As in the case of apparatus 100, CT imaging system 600 may have transformer portions that substantially face each other or that comprise concentric cylinders.

Some of the embodiments of CT imaging system 600 are medical imaging systems. Other embodiments of CT imaging system 600 are industrial or security scanning systems, such as a bomb detection system for baggage. The embodiments may be defined by the type of firmware or software that is included in CT imaging system 600. In the case of a medical imaging system, the software or firmware in CT imaging system 600 is configured to analyze biological structures and/or organs. A CT imaging system 600 for bomb detection in luggage includes software configured to analyze the content of baggage for bombs and/or explosive material.

Figure 11:
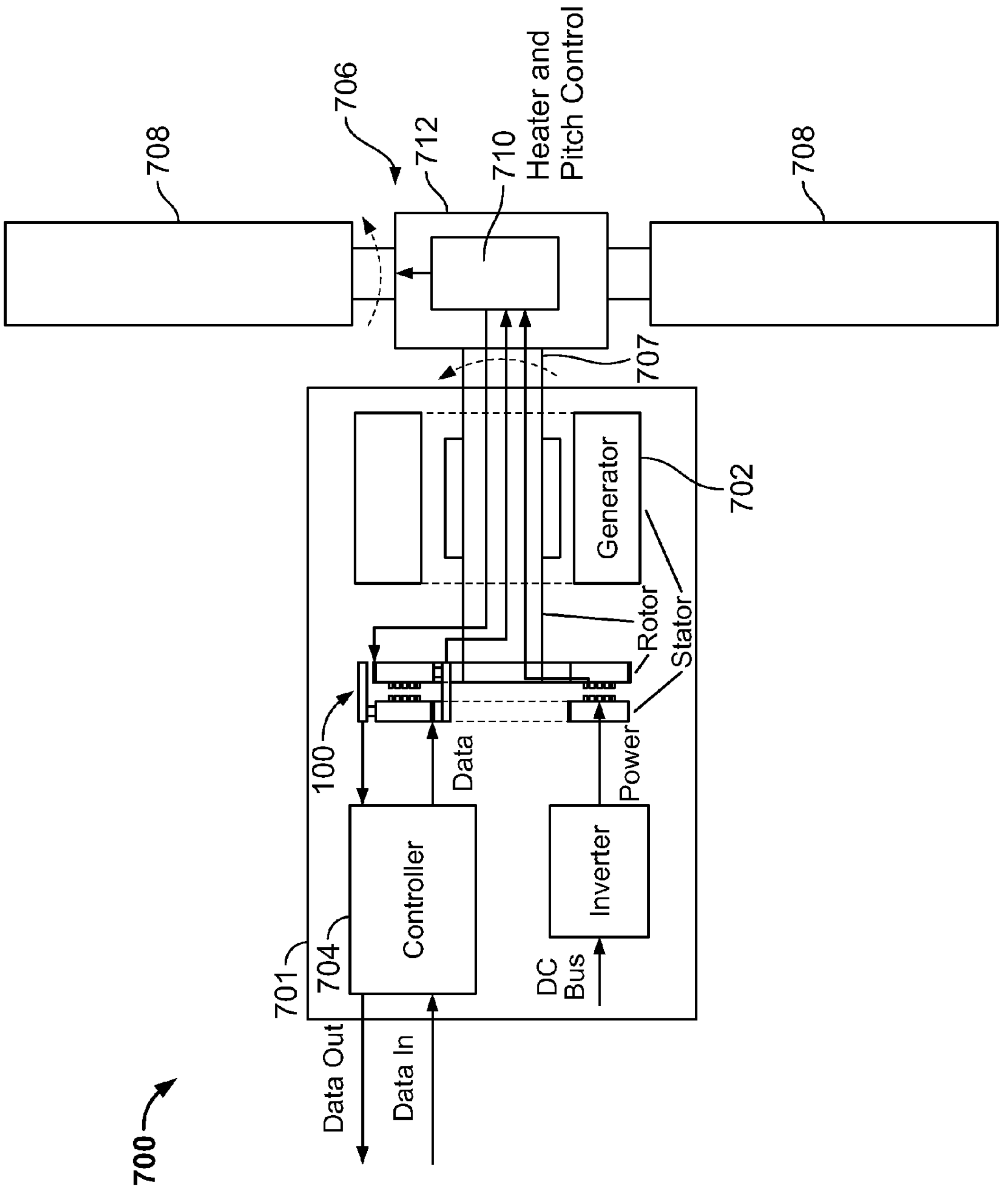
FIG. 11 is a pictorial schematic drawing of a wind turbine embodiment of the present invention.

FIG. 11 is a pictorial schematic drawing of a wind turbine 700 constructed in accordance with an embodiment of the present invention. Wind turbine 700 includes a nacelle 701 housing a generator 702 and various electrical, electronic, and mechanical components. Among the electronic components is a controller 704 that is configured to communicate data with various sensors and controls within wind turbine 700 and with an external computer that is used to monitor and control the operation of wind turbine 700. In use, wind turbine 700 may be mounted on a tall, vertical tower (not shown in the Figures) so as to permit rotation of rotor 706 about an essentially horizontal axis without interference to blade or blades 708 from the ground and other obstacles. Rotor 706 includes a rotatable shaft 707 to turn generator 702 when a wind sufficient to operate wind turbine 700 is available.

Controller 704 operates pitch blade control and heater 710 that can turn nacelle 701 in various directions along a vertical axis to orient blades 708 in a proper direction for capturing energy from the wind or to stop or control wind turbine 700 as required. In addition, wind turbine 700 includes a blade pitch control and heater 710 in a hub 712 of rotor 706 to which blade or blades 708 are attached. Blade pitch control and heater 710 operates under control of wind turbine controller 704. Controller 704 is further configured to send power and control signals to blade pitch control and heater 710 to de-ice blades 708 as necessary and to pitch blades 708. An apparatus for transmitting power and data, such as apparatus 100 described above in respect to FIG. 1 and FIG. 2 may be used and has a stationary portion and a rotating portion, the latter mounted on shaft 707 and having wires running through center hole of shaft 707 to hub 712 to provide power and control signals to blade pitch control and heater 710. This arrangement permits transfer of power and data without twisting of wires to the blade pitch control and heater 710. Bidirectional data transfer may be used to allow controller 704 to receive and process data from sensors located in hub 712 and/or on and/or in blade or blades 708.

Referring to FIGS. 1 and 7, wind turbine 700 may include a power and data transmission apparatus 100 wherein first data receiver 120 and first data transmitter 116 are coupled electrically and second data receiver 124 and second data transmitter 122 are also coupled electrically. The designations "first" and "second" can be associated with "stationary" and "rotatable" arbitrarily, provided the association is consistent throughout. Note, however, that the first and the second data receivers are on the opposite sides of the first and the second data transmitter, respectively. In addition, referring to FIG. 3 as well, wind turbine 700 may include a power and data transmission apparatus 100 wherein the first data receiver 120, the second data receiver 124, the first data transmitter 116 and the second data transmitter 122 comprise sectioned, circular antennas. The sections of the circular antennas can be phased in the manner described herein to reduce or eliminate phase discontinuities in coupled data signals. Also, in some embodiments of wind turbine 700 and referring to FIG. 8, rotary transformer 107 can comprise a pair of E-cores 112 and 114 with open sides of the E-cores facing one another.

In variations of the embodiments, it will be appreciated that the stationary transmitter may be placed on an outer circumference of the stationary transformer portion and the rotating transmitter may be placed on an inner circumference of the rotating transformer portion, with the receivers moved accordingly. The transmitters and receivers may also be placed on surfaces facing each other. Also, the transmitters and receivers may use any one of electrical, magnetic or optical signals, or a combination thereof, to transmit between rotating and stationary portions in a contactless manner.

At least one technical effect of the various embodiments is to provide, using contactless means, high speed bi-directional communication links along with high power transformer coupling in a reduced spatial volume and at reduced cost and complexity as compared to devices or combinations of devices used today for similar purposes. In addition, a high level of reliability for contactless power transfer and bi-directional communications is achieved.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An apparatus for transmitting power and data, said apparatus comprising:

a rotary transformer having first and second transformer portions relatively rotatable around a common axis and separated from one another by a gap;

differential windings on the first and second transformer portions, the differential windings configured to transfer power between the first and second transformer portions across the gap in a contactless manner;

a first data transmitter and a first data receiver on the first transformer portion; and a second data transmitter and a second data receiver on the second transformer portion, the first data transmitter communicating data to the second data receiver and the second data transmitter communicating data to the first data receiver across the gap in a contactless manner wherein the first data receiver is cantilevered over the first data transmitter such that the first data transmitter is between the first data receiver and the common axis, further wherein the second data receiver is cantilevered below the second data transmitter such that the second data receiver is between the second data transmitter and the common axis.

2. The apparatus of claim 1, wherein the first transformer portion and the second transformer portion comprise substantially concentric cylinders.

3. The apparatus of claim 1, wherein the first and second data transmitters and the first and second data receivers bi-directionally communicate data across the gap.

4. The apparatus of claim 1, wherein the first data transmitter and the first data receiver magnetically communicate data across the gap while the second data transmitter and the second data receiver electrically communicate data across the gap.

5. The apparatus of claim 1, wherein the first data transmitter radially communicates data to the first data receiver across the gap in a first direction and the second data transmitter radially communicates data to the second data receiver across the gap in a second, opposite direction.

6. The apparatus of claim 1, wherein each of the first and second rotary transformer portions includes an E-core with the differential windings extending through the E-cores, an open side of the E-core of the first rotary transformer portion facing an open side of the E-core of the second rotary transformer portion.

7. The apparatus of claim 6, wherein the B-cores restrict emission of electromagnetic interference such that the differential windings are configured to transfer power of at least 150 kWatts between the first and second transformer portions without interfering with data voltages of less than 1 Volt that are communicated among the first and second data transmitters and the first and second data receivers.

8. A computed tomography (CT) imaging system comprising:

a stationary gantry portion including a differential winding, a data transmitter and a data receiver;

a rotatable gantry portion separated from the stationary gantry portion by a gap and configured to rotate about an axis relative to the stationary gantry portion, the rotatable gantry portion including a differential winding configured to communicate power with the differential winding of the stationary gantry portion across the gap, a data transmitter configured to transmit data to the data receiver of the stationary gantry portion across the gap, and a data receiver configured to receive data from the data transmitter of the stationary gantry portion across the gap; and a radiation source and detector joined to the rotatable gantry portion and disposed opposite one another to image a target positioned between the radiation source and detector, wherein the differential windings inductively transfer power across the gap in a contactless manner and the data transmitters and the data receivers communicate data across the gap in a contactless manner, wherein the data receiver of the stationary gantry portion is cantilevered over the data transmitter of the rotatable gantry portion such that the data transmitter is between the data receiver and the axis, further wherein the data receiver of the rotatable gantry portion is cantilevered below the data transmitter of the stationary gantry portion such that the data receiver is between the data transmitter and the axis.

9. The CT imaging system of claim 8, wherein the stationary gantry portion and the rotatable gantry portion comprise substantially concentric cylinders.

10. The CT imaging system of claim 8, wherein at least one of the differential stripline transmission lines is wrapped around the corresponding one of the stationary gantry portion and the rotatable gantry portion.

11. The CT imaging system of claim 8, wherein the data transmitters and the data receivers bi-directionally communicate data across the gap in directions perpendicular to the axis.

12. The CT imaging system of claim 8, wherein one of the data transmitters magnetically communicates data with the corresponding data receiver while the other one of the data transmitters electrically communicates data with the corresponding other data receiver.

13. The CT imaging system of claim 8, wherein each of the stationary and rotatable gantry portions includes an E-core with the differential windings extending through the E-cores.

14. The CT imaging system of claim 13, wherein the E-cores restrict emission of electromagnetic interference such that the differential windings are configured to transfer power of at least 150 kWatts between the rotatable and stationary gantry portions without interfering with data voltages of less than 1 Volt that are communicated between the data transmitter of the rotatable gantry portion and the data receiver of the stationary gantry portion and between the data transmitter of the stationary gantry portion and the data receiver of the rotatable gantry portion.

15. The apparatus of claim 14, wherein the stripline transmission lines are wrapped around the corresponding transformer portion.

16. The CT imaging system of claim 8, wherein the data transmitter of the rotatable gantry portion communicates data to the data receiver of the stationary gantry portion in a first direction across the gap and the data transmitter of the stationary gantry portion communicates data to the data receiver of the rotatable gantry portion in a second, opposite direction across the gap.

* * * * *